Oct. 9, 1962

H. EGGELING 3,058,050

STABILITY ANGLE LIMIT REGULATOR FOR
ALTERNATING CURRENT GENERATORS

Filed Nov. 13, 1959

INVENTOR.
Helmut Eggeling
BY
Pierce Scheffler & Parker
Attorneys

United States Patent Office 3,058,050
Patented Oct. 9, 1962

3,058,050
STABILITY ANGLE LIMIT REGULATOR FOR ALTERNATING CURRENT GENERATORS
Helmut Eggeling, Gebenstorf Aarg, Switzerland, assignor to Aktiengesellschaft Brown, Boveri & Cie, Baden, Switzerland, a joint-stock company
Filed Nov. 13, 1959, Ser. No. 852,864
Claims priority, application Switzerland Dec. 8, 1958
4 Claims. (Cl. 322—20)

This invention relates to a generator voltage regulation and in particular to a device which limits, in cooperation with the voltage regulator of an alternating current generator, its minimum excitation to a value which is determined by the static stability limit. As known, the latter is determined by the pole-wheel angle for which the synchronizing moment attains a minimum. The pole-wheel angle $\varphi_P$ (FIG. 1) is understood to be the angle between the pole-wheel voltage E (induced E.M.F.) and the terminal voltage $U_K$. The stability angle is formed by the synchronous reactance of the generator and the outer reactance of the mains. Besides, the angle $\varphi_N$ is also important for the stability angle. It is formed by the mains reactance, and is thus the angle between the terminal voltage $U_K$ and the voltage at a certain mains point $U_N$. The stability angle $\varphi_S$ is then the angle between the pole-wheel voltage E and this mains voltage $U_N$, hence $\varphi_P + \varphi_N = \varphi_S$. In closely interconnected mains this mains reactance $x_E$ is small compared to the synchronous reactance $x_D$ of the generator machine, so that the terminal voltage $U_K$ can be equated in many cases, approximately, with the mains voltage $U_N$. The actual stability limit in nonsalient pole machines is at 90 deg., in salient pole machines it is at about 100 deg. It has been demonstrated by theoretical investigations and practical tests, that a synchronous machine can be operated, when using a quick-acting-voltage regulator, beyond the static stability limit up to the dynamic stability limit without falling out of step. Since the terminal voltage increases with increasing stability angle, the voltage regulator regulates the excitation down. The pole-wheel voltage is thus reduced, but the stability angle is further increased, so that the danger of falling out of step also increases. Additional equipment must therefore be provided which prevents a reduction of the voltage when the static stability limit is exceeded. Arrangements are known where the minimum excitation of synchronous machines is limited. To this end, a measuring quantity is used which is formed by the vector sum of two voltages. When the static stability limit of 90 deg. is attained, this vector sum becomes zero, so that the voltage regulator is so influenced that it no longer regulates down. In this arrangement the voltage $U_N$ and the voltage drop of the current I in the synchronous reactance $x_D$, and in the mains reactance $x_E$, are compared with each other according to the following equation:

$$I(x_D + x_E) \cos \vartheta - U_N$$

where $\vartheta$ is the angle between the voltage drop and the mains voltage (FIG. 1). The stability angle of 90 deg. can be established here correctly, but it is not possible to determine the deviation from the stability angle correctly. If the angle is greater or smaller than $\varphi_S$, a differential voltage is formed which is not proportional to the stability angle. Consequently, it is not possible to set the response angle for the attachment for a value different than 90 deg. The regulator can be moved in the right direction, but the regulating quantity can not be determined unambiguously. It is the object of the present invention to avoid this inconvenience. According to the invention it is suggested to use a goniometric system for determining the stability angle, which reverses and actuates a continuous transmitter that depends only on the phase angle between the two voltages and which influences the voltage regulator.

As a goniometric system can be used, for example, a Ferraris measuring mechanism to which are fed the pole-wheel voltage E and the voltage of a certain point in the mains $U_N$.

Figure 2:
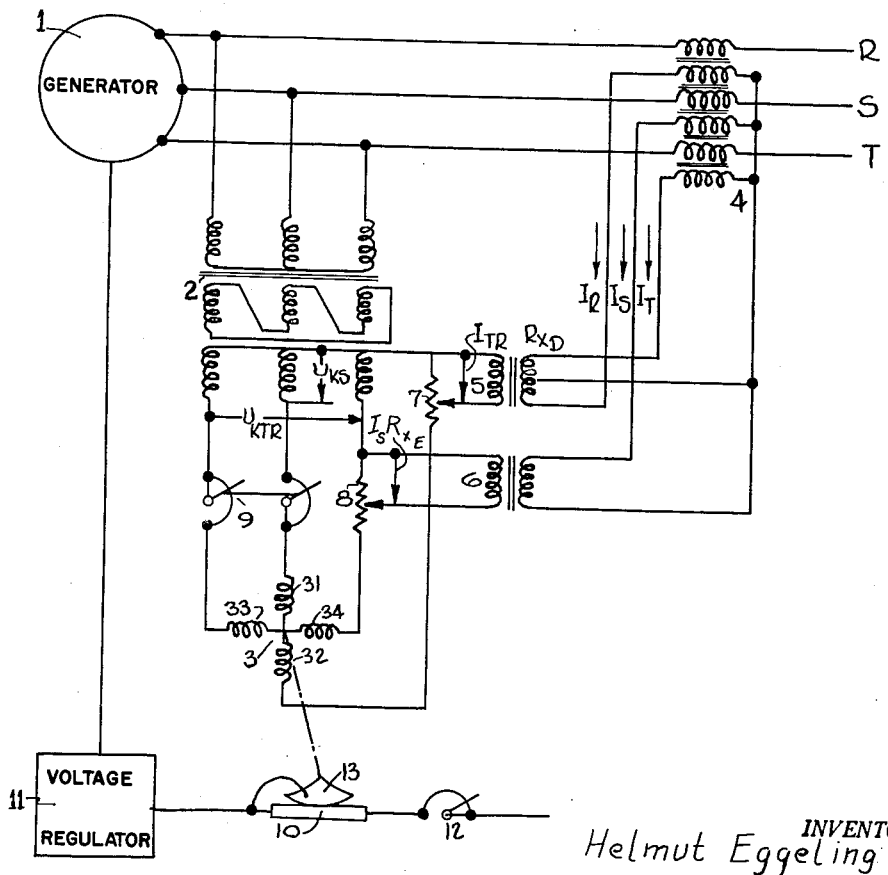

Referring now to FIG. 2, a synchronous alternating current generator machine 1 feeds a three-phase mains RST. As measuring quantities are available the terminal voltage $U_K$ and the current I. The Ferraris measuring mechanism 3 develops a torque $M_D = I_1 I_2 \sin \varphi_{1,2} K$, that is, with currents of like phase or opposite phase in the respective windings, the torque becomes zero. A true-to-angle image of the pole voltage E and of the mains voltage U must therefore be obtained in the circuit in such a way that the currents $I_1$, $I_2$ become in phase or 180 deg. out of phase at the stability angle. The limiting angle to be determined is then characterized by a reversal of the torque in the measuring mechanism. When the stability angle varies, a regulating quantity is formed which varies proportionally with the sine of the stability angle. In order to achieve this, the pole-wheel voltage and the mains voltage are used as measuring quantities. They are so fed to the Ferraris system that their product becomes zero when they form with each other an angle $\varphi_{1,2}$ equal to the stability angle $\varphi_S$. The pole-wheel voltage is composed of the terminal voltage, obtained from the transformer 2, and of the voltage drop of the current in an equivalent impedance equal to the synchronous reactance of the generator. A Y-voltage, for example, $U_{KS}$, is assembled with the voltage drop of the delta current $I_{TR}$, which is formed over the current transformers 4 and 5 in the adjustable resistance 7 ($R_{XD}$). This voltage drop $J_{TR} R_{XD}$ is in phase with the voltage drop of the current $J_S$ in the synchronous reactance $X_D$. Consequently $J_{TR} R_{XD}$ is an image of the actual voltage drop in the generator. The vectorial sum of these two voltages, that is, $U_{KS} - jI_{TR}x_D$ reproduces therefore the pole-wheel voltage E. It is fed to the windings 31 and 32 of the Ferraris element. In order to obtain the mains voltage $U_N$, the terminal voltage $U_K$ is likewise used. But the Y voltage $U_{KTR}$ is selected because this voltage is perpendicular to the voltage $U_{KS}$. This has the effect that with a pole wheel angle of 0, both voltages are perpendicular to each other, so that the maximum torque $M_D$ is at the Ferraris system. One also obtains the current $I_S$ which is fed over the transformer 6 to the adjustable resistance 8 ($Rx_E$) whose value corresponds to the mains reactance $x_E$ up to the point whose voltage is to be fed to the regulating device. At the windings 33 and 34 of the Ferraris system is therefore the vectorial sum $U_{KTR} - jI_S R x_E = U_N$. This has the result that with a stability angle of 90 deg. the two currents $I_1$, $I_2$ flowing in the coils are equidirectional or oppositely directed, forming an angle of 0 or 180 deg. In this case the torque is zero and the Ferraris system tips into the other direction of rotation. The arrangement is such that there is no actuation at stability angles of less than 90 deg. while at angles over 90 deg. the resistance 10 is shifted, which is arranged in series with the adjustable resistance 12 of the quick-acting voltage regulator 11. The resistance 10 is made variable in the example by a rolling segment 13 which is coupled with the rotary system of the Ferraris measuring mechanism 3. Depending on the amplitude of the deflection of the Ferraris system the resistance is more or less adjusted. Due to this measure the voltage is apparently reduced on the regulator 11 so that the regulator has a tendency to regulate the voltage up. This has the effect that, when the stability angle is exceeded, the pole-wheel voltage is increased until the angle is again below the stability limit; the voltage regulator then operates normal again.

A special advantage of the selected arrangement is that it is possible in the selection of the above mentioned quantities to adjust the required response angle and the impedances within wide limits. The equivalent impedances 7 and 8 can be shifted. The rheostats 9 connected between the transformer 2 and the measuring system 3 vary the amount of the response angle. The angle between the currents fed to the Ferraris system corresponds to the required stability angle only when the impedance angles in the circuits of both measuring quantities are equal. If one desires to vary the required response angle, it is thus necessary to adjust both circuits simultaneously, varying both resistances in opposite directions to obtain a different response angle than 90 deg.

Figure 1:
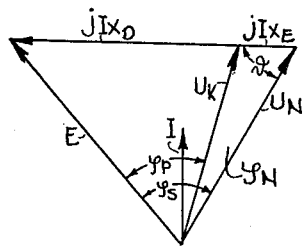
FIG. 1 is a vector diagram showing the relationship between various voltage and current factors of an alternating current generator and the mains connected therewith to which the invention is applied.
Figure 3:
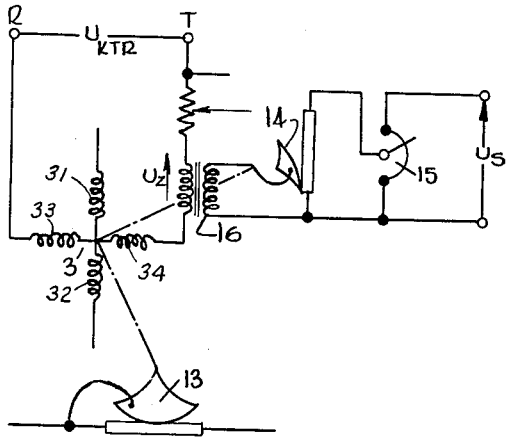
FIG. 2 is a circuit diagram of a generator regulator system which illustrates the inventive concept more clearly and FIG. 3 illustrates a modification.

FIG. 3 shows another attachment which introduces a current-dependent additional quantity in the measuring circuit. This is necessary if the deflection of the rotary system is to be proportional with the exceeding of the response angle. This dependence corresponds to the statism of an ordinary regulator. It is obtained by a second segment type contact path 14 which is actuated simultaneously with the segment 13. The second segment is fed from the Y voltage $U_S$ over an adjustable resistance 15. Depending on the deflection, a higher or lower voltage is fed over the transformer 16 into the circuit for the measurement of the pole-wheel voltage. In the end position of the segment, the voltage formed in the transformer 16 is zero. If the regulator responds, the voltage increases. Since this additional voltage $U_Z$ connected in series with the goniometer coil set 33, 34 is perpendicular to the pole-wheel voltage, the resulting voltage is phases shifted. The torque is thus less than corresponds to the exceeding of the stability angle. By varying the adjustable resistance 15 connected in circuit with contact path 14 it is possible to vary the statism. As an alternative, the additional voltage $U_Z$ may be connected in series with the other goniometer coil set 31, 32.

The suggested arrangement has the advantage that the deflection of the measuring element can be further utilized, since a static is carried which makes the regulating circuit more stable than in the known arrangements. Besides, it is possible to adjust the response angle so that stability angles can also be taken into account which are greater or smaller than 90 deg. This way it is also possible to utilize salient pole machines where the stability angle is about 100 deg.

I claim:
1. In an arrangement for controlling the voltage of a synchronous three-phase alternating current generator connected into an alternating current mains, a voltage regulator connected to said generator for regulating the terminal voltage of said generator, means for modifying the normal regulating characteristics exercised by said voltage regulator and means actuating said regulator characteristic modifying means to effect an upward regulation of said generator terminal voltage whenever the stability angle of said generator exceeds a predetermined limit, said actuating means for said voltage regulator characteristic modifying means including a goniometer composed of a rotary member having two sets of angularly displaced coils arranged such that when said coil sets are energized respectively with currents of like or opposite phase the output torque on said rotary member is zero, means algebraically combining a first voltage proportional to the terminal voltage of said generator with a second voltage equal to the product of a current proportional to the current in the mains fed by said generator and an impedance corresponding to the synchronous reactance of said generator to establish a pole-wheel voltage, means algebraically combining a third voltage proportional to the terminal voltage of said generator but displaced 90° in phase relative to said first voltage with a fourth voltage equal to the product of a current proportional to said mains current and an impedance corresponding to the reactance of said mains to establish a mains voltage, circuit means applying said pole-wheel and mains voltages respectively to said goniometer coil sets on said rotary member and means coupling said rotary member to said voltage regulator characteristic modifying means.

2. The invention as defined in claim 1 and which further includes means for simultaneously adjusting said pole-wheel and mains voltages.

3. The invention as defined in claim 1 and which further includes means for adjusting said impedances.

4. The invention as defined in claim 1 and which further includes means connecting in circuit with one of said coil sets a further voltage having a magnitude proportional to the angular displacement of said goniometer rotary member.

References Cited in the file of this patent
UNITED STATES PATENTS

| | | |
|---|---|---|
| 2,700,748 | Brittern | Jan. 25, 1955 |
| 2,764,729 | Israel | Sept. 26, 1955 |